United States Patent
Chaffin (10) Patent No.: US 9,223,546 B1
(45) Date of Patent: *Dec. 29, 2015

(54) CODE GENERATOR TOOL FOR BUILDING SOFTWARE APPLICATIONS WITH REUSABLE COMPONENTS

(75) Inventor: Mary Ellen Chaffin, Atlanta, GA (US)

(73) Assignee: Open Invention Network, LLC, Durham, NC (US)

( * ) Notice: Subject to any disclaimer, the term of this patent is extended or adjusted under 35 U.S.C. 154(b) by 615 days.

This patent is subject to a terminal disclaimer.

(21) Appl. No.: 12/772,357

(22) Filed: May 3, 2010

Related U.S. Application Data (63) Continuation of application No. 11/080,735, filed on Mar. 15, 2005, now Pat. No. 7,761,848.

(51) Int. Cl.
  *G06F 9/44* (2006.01)
(52) U.S. Cl.
  CPC .. *G06F 8/20* (2013.01); *G06F 8/30* (2013.01); *G06F 8/36* (2013.01); *G06F 8/24* (2013.01)
(58) Field of Classification Search
  CPC .............................................. G06F 8/20–8/30
  See application file for complete search history.

(56) References Cited

U.S. PATENT DOCUMENTS

| | | | |
|---|---|---|---|
| 5,774,722 A | 6/1998 | Gheith | |
| 5,845,118 A | 12/1998 | Gheith | |
| 5,860,004 A | 1/1999 | Fowlow et al. | |
| 5,864,862 A | 1/1999 | Kriens et al. | |
| 5,878,432 A | 3/1999 | Misheski et al. | |
| 5,890,183 A | 3/1999 | Fujimoto | |
| 5,915,113 A | 6/1999 | McDonald et al. | |
| 5,926,637 A | 7/1999 | Cline et al. | |
| 6,002,395 A | 12/1999 | Wagner et al. | |
| 6,226,792 B1 | 5/2001 | Goiffon et al. | |
| 6,243,859 B1 | 6/2001 | Chen-Kuang | |
| 6,405,366 B1 | 6/2002 | Lorenz et al. | |
| 6,604,110 B1 | 8/2003 | Savage et al. | |
| 6,606,711 B2 | 8/2003 | Andrews et al. | |
| 6,654,932 B1 * | 11/2003 | Bahrs et al. | 715/210 |
| 6,654,947 B1 | 11/2003 | North et al. | |
| 6,658,425 B1 | 12/2003 | Sluiman | |
| 6,697,819 B2 | 2/2004 | Boudreau | |

(Continued)

FOREIGN PATENT DOCUMENTS

EP     1372066     12/2003

OTHER PUBLICATIONS

Yao, P., Durant, D. ".NET Compact Framework Programming with C# Addison Wesley Professiona." May 24, 2004. pp. 2, 45, 48, 49, 51, 83, 837. (Retrieved online: http://proquest.safaribooksonline.com/ 0321174038 Oct. 9, 2008).

*Primary Examiner* — Matthew Brophy
(74) *Attorney, Agent, or Firm* — Haynes and Boone, LLP (57) ABSTRACT

A method and computer program product for building a multiple layer object-oriented software application with reusable components. The method includes creating business classes containing a business logic for the software application, wherein the business classes are organized into hierarchies identified as namespaces, and then generating executable programming code for the software application. From there, the method may include placing the executable programming code into an at least one assembly structure for an associated layer, wherein a security token is required to access the business classes, and wherein the business classes are created to validate each security token passed by a user interface.

20 Claims, 7 Drawing Sheets

(56) References Cited

U.S. PATENT DOCUMENTS

| | | | |
|---|---|---|---|
| 7,017,147 B2 | 3/2006 | Hayase et al. | |
| 7,134,138 B2 | 11/2006 | Scherr | |
| 7,213,227 B2 | 5/2007 | Kompalli et al. | |
| 7,237,225 B2 | 6/2007 | Kompalli et al. | |
| 7,240,327 B2 | 7/2007 | Singh et al. | |
| 7,296,275 B2 | 11/2007 | Colley et al. | |
| 7,444,620 B2 * | 10/2008 | Marvin | G06F 8/36 717/116 |
| 8,136,109 B1 * | 3/2012 | Birdeau et al. | 717/175 |
| 2002/0186248 A1 | 12/2002 | Ramanathan et al. | |
| 2003/0056195 A1 | 3/2003 | Hunt | |
| 2003/0182457 A1 | 9/2003 | Brewin | |
| 2003/0200532 A1 | 10/2003 | Gensel | |
| 2003/0233367 A1 | 12/2003 | Uluakar et al. | |
| 2004/0010776 A1 | 1/2004 | Shah | |
| 2004/0068713 A1 | 4/2004 | Yannakoyorgos et al. | |
| 2005/0091670 A1 | 4/2005 | Karatel et al. | |
| 2005/0144226 A1 * | 6/2005 | Purewal | G06F 8/70 709/203 |
| 2005/0223388 A1 * | 10/2005 | Gehman | G06F 8/36 719/321 |

\* cited by examiner

CODE GENERATOR TOOL FOR BUILDING SOFTWARE APPLICATIONS WITH REUSABLE COMPONENTS

CROSS-REFERENCE TO RELATED APPLICATIONS

This application is a continuation of and claims priority from U.S. patent application Ser. No. 11/080,735, filed on Mar. 15, 2005 entitled CODE GENERATOR TOOL FOR BUILDING SOFTWARE APPLICATIONS WITH REUSABLE COMPONENTS, which is incorporated by reference herein in its entirety.

BACKGROUND OF THE INVENTION

The present invention relates generally to computer source code generation, and more particularly, to the generation of business application source code with reuse components integrated.

Software reuse is usually identified with the reuse of source code across software systems. Source code is extremely difficult to reuse on a large scale. It has been estimated that U.S. companies waste as much as $145 billion a year on failed IT projects. Less than 10% of technology investments are completed on time and within budget.

Figure 1:
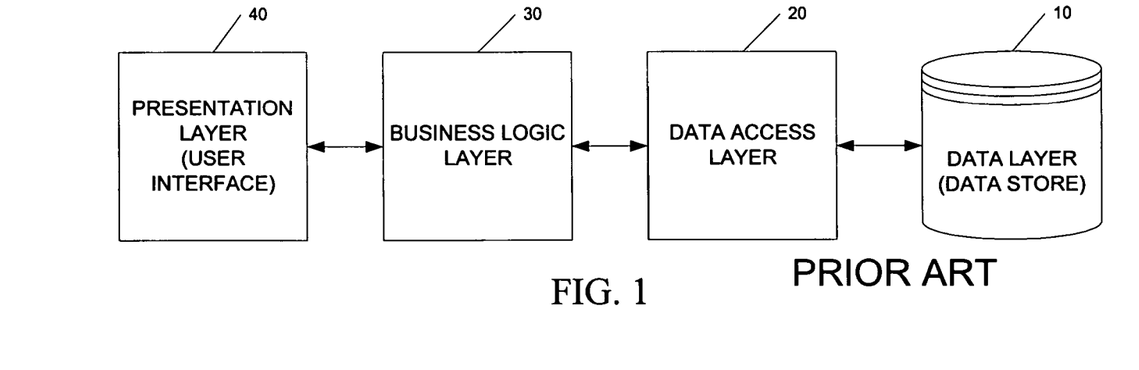
FIG. 1 illustrates an N-tier software architecture in the prior art.

Application architectures have been developed using an N-tier approach. N-tier applications have become the norm for building enterprise software. The terms "tier" and "layer" are used synonymously. The principles of N-tier design are concerned with building distinct layers into applications so that maintenance and development becomes a concentrated effort within a particular layer. FIG. 1 illustrates an N-tier software architecture known in the software development art. The logical layers of presentation 40, business logic 30, data access 20 and data 10 may reside on the same physical machine or on many physical machines. The data tier or layer 10 is basically a database management system. This layer is intended to deal with the storage and retrieval of information. This layer can range from complex high-end products such as SQL Server or Oracle to simple plain text files, including an XML database. The data access layer 20 is the interface to the data layer 10. It contains generic and specific methods that handle all data input and output and persist data into the database 10. The business logic layer 30 contains business objects and rules, data manipulation and transformation logic, etc. in other words, this layer manipulates and transforms data passed to it from the data access layer 20. The presentation layer (user interface layer) 40 is the layer that provides an interface for an end user into an application. It handles the transformation of the results output from the business logic layer 30 into something that is usable and readable by the end user.

A single application may have multiple components in a single layer. As examples, the presentation layer 40 may have both a web and a Windows-based user interface. There may be multiple business logic components involved in a single application including the main application logic as well as other components, for example, account validation, security, or personal/employee information stored in a different location. Different data access components can be used if there are different types of data stores in use, for example, Oracle, SQL Server, DB2, text files, etc.

SUMMARY OF THE INVENTION

The present invention is a productivity application designed to help developers create N-tier, C# application frameworks for both Windows and Web-based applications. It incorporates many reusable components into the generated shell ready for use. In the past, applications were built from scratch. This meant the development team spent valuable time and resources on tasks, code, and configuration that is exactly the same between applications. The code, structure, and conventions used within applications had little or no consistency or commonality.

In an aspect of the invention, a method includes creating business classes containing a business logic for the software application, wherein the business classes are organized into hierarchies identified as namespaces, and then generating executable programming code for the software application. From there, the method may include placing the executable programming code into an at least one assembly structure for an associated layer, wherein a security token is required to access the business classes, and wherein the business classes are created to validate each security token passed by a user interface.

There is a present need in application development to eliminate the time and resources spent building the common parts of an application. The development team can then concentrate on building the business functionality (i.e., business logic) of the application. Applications will thereby exhibit greater consistency thus reducing maintenance costs. Developers will be able to move between different applications without having to learn each application's structure, utilities, and configuration; these items will be the same between all generated applications thus ensuring consistency, maintainability, and reliability across applications.

In an exemplary embodiment, the multiple layers include a data layer, a data access layer, a business logic layer and a user interface layer with executable logic for each layer placed into a corresponding assembly data structure. Security tokens are required to access the classes and methods in either the business logic assembly or data access assembly. A serializable data assembly includes container classes that are used to pass data between the business logic layer and data access layer when a dataset or data table is not appropriate. A code generator user interface enables an application developer to define a namespace, a deploy directory name, a database type, an application type, a target source code directory, and a plurality of class specifications and search criteria.

In another aspect of the invention, a computer program product is provided for building a multiple layer object-oriented software application with reusable components. The program product includes a computer readable medium having computer readable code embedded therein including program instructions that enable creating business classes containing a business logic for the software application; program instructions that read templates utilizing reusable components from a template solution file; and program instructions that generate programming code for the software application based on the created business classes and selected template.

DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

The exemplary embodiment of the invention is described in terms of the .NET Framework, ASP.NET and the C# high level language. The essentials of .NET, ASP.NET and C# necessary to understand the exemplary embodiment of the invention are briefly discussed herein.

The .NET Framework has two main elements—a virtual machine called the Common Language Runtime (CLR) and the Base Class Libraries (BCL). When a program is developed for .NBT in a high level language such as C# or VB.NET, the compiler generates Intermediate Language (IL) which is similar to assembly language code. The CLR then takes the code in IL form and converts it to machine code that it executes. The code that is generated is called managed code. The CLR controls all aspects of allocating memory and lifetime of objects. The BCL is a set of classes and functions that enable the programmer to talk to the operating system and to other technologies, such as XML, ASP.NET and ADO.NET. BCL eliminates the need to code to the W1N32 application programming interface (API) directly.

The .NET Framework classes (system classes) provide core functionality when building ASP.NET applications. The system classes live within assemblies. The .NET assembly represents the executable file that holds the class. There are two types of assemblies in .NET—private and shared. Private assemblies can be used in a single application and are typically located in an application's bin folder. Shared assemblies can be used across applications and must be loaded into the global assembly cache by the assembly's creator. The .NET system classes are all shared assemblies. The .NET classes are organized logically into hierarchies called namespaces. A namespace is a language feature that appends a prefix to every class name to make the class name unique. Namespaces can be nested several levels deep within the hierarchy.

The .NET classes contain static and instance members. Static (shared) members are shared across all instances of a class; instance members work on a specific instance of an object which means the object instance has to be created before an instance member can be used. Members are the properties, methods, fields, events and constructors that make up a class. A property is an attribute of a class. A method is an action that the class knows how to perform. A field is similar to a property. An event represents something to which a reaction can be made. A constructor is a special type of method that is called when a new object is created.

C# is derived from C++ but is simpler. C# doesn't use pointers, has single inheritance, does not have macro support, and does not have template support. Single inheritance means that a class can only derive from at most one other class. When a class inherits from another class, it gains all the properties, methods, fields, events, and constructors from the class it inherited from. The class inherited from is the base class. The class that inherits from the base class is referred to as the derived class. Classes are declared by using the keyword class followed by the class name and a set of class members surrounded by curly braces. Every class has a constructor, which is called automatically any time an instance of a class is created. The purpose of constructors is to initialize class members when the class is created. Constructors do not have return values and always have the same name as the class.

Most of the BCL classes are written in C#. The other principal language for the .NET Framework is Visual Basic. NET (VB.NET) that has been modified significantly from Visual Basic to account for the object-oriented features of the BCL. Both C# and VB compile to IL, thus their performance is about the same.

In C#, there is a complete separation between physical packaging of code and logical naming of namespaces. Each source file can be given any name and can contribute to multiple namespaces and can take multiple public classes.

ASP.NET is a programming framework built on Common Language Runtime that can be used on a server to build web applications. ASP.NET is language independent so a language can be chosen that is most suitable for the application. ASP.NET pages can be written in C#, VB.NET, or newer versions of JavaScript. The advantage of ASP.NET is that it can use all the features of C#, just like a desktop application. ASP.NET defines an application as the collection of files, pages, handlers, modules and code that can be invoked or run in the scope of a virtual directory or on a web application server. Visual Studio.NET provides an integrated environment for developing and debugging ASP.NET applications. To debug an application, breakpoints are added to the code and then the application is run. If the debugger encounters a line of code with a breakpoint, it pauses the execution of the program and puts it back in the edit window.

It is important for web applications to identify users and control access to resources. Authentication is the act of determining the identity of the requesting user. Typically, the user must present credentials such as a name/password pair in order to be authenticated. Once the authenticated identity is established, the right to access a given resource must be determined. ASP.NET Framework applications can check dynamically that the requesting user can act in a particular role.

Figure 2:
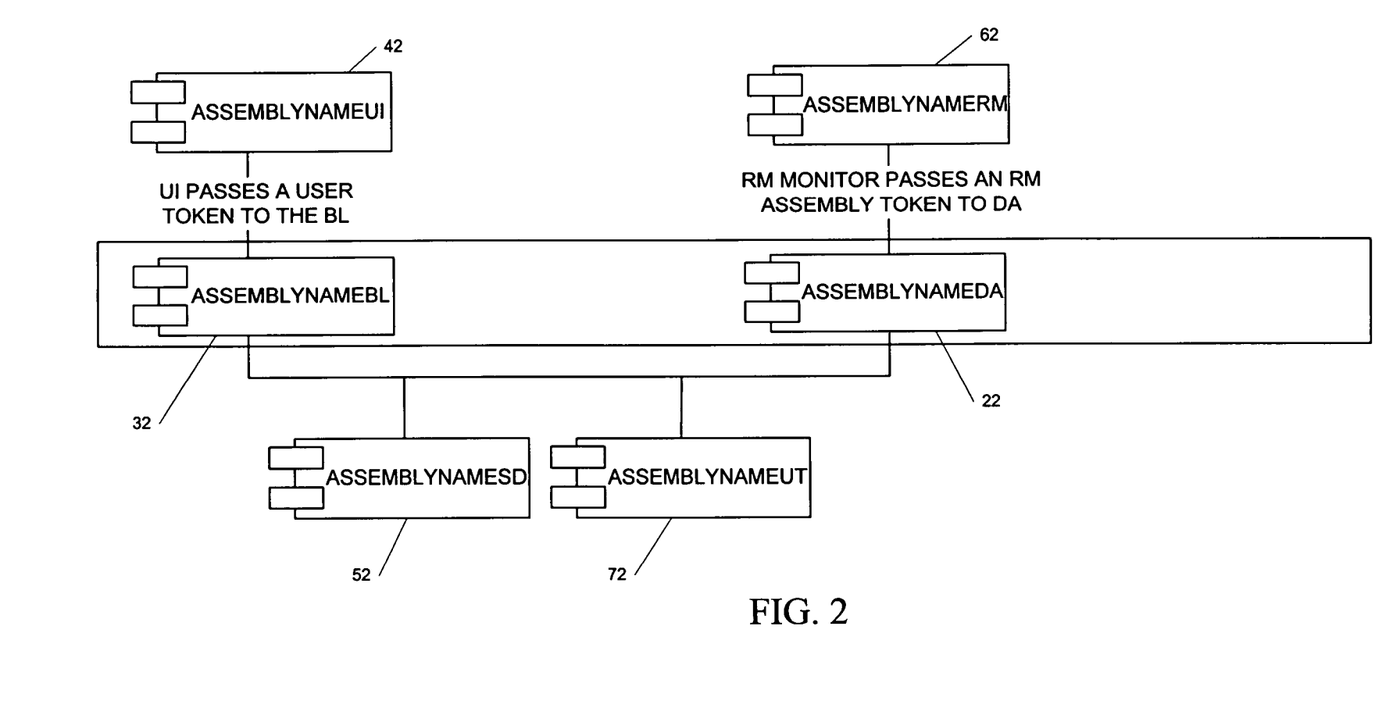
FIG. 2 illustrates the assembly structure and layer security of the present invention in an exemplary embodiment.

FIG. 2 illustrates the assembly structure of the present invention in the context of the .NET Framework. Specifically, this figure depicts the security aspects of the invention. All secure logic should be contained in the business logic assembly 32 and the data access assembly 22. These two assemblies have methods that require security tokens. The user interface assembly 42 passes a user token to the business logic assembly 32. The remoting host monitor script 62 passes a remoting host assembly token to the data access assembly 22. The business logic assembly 32 passes serializable credential object to the data access assembly. The credential object contains a user token and a business logic assembly token. Also depicted in FIG. 2 are serializable data assembly 52 and utility assembly 72. The utility assembly 72 includes common functions that are used throughout the application. Such functions can include, but are not limited to, a particular type of validation, field formatting, diagnostic logging, or security checks. The utility assembly 72 is optional. The data access assembly 22 includes methods that call BaseDA Authorize-Callers method. This enables only the business logic assembly 32 and remoting host assembly 62 to access the data access methods.

Figure 3:
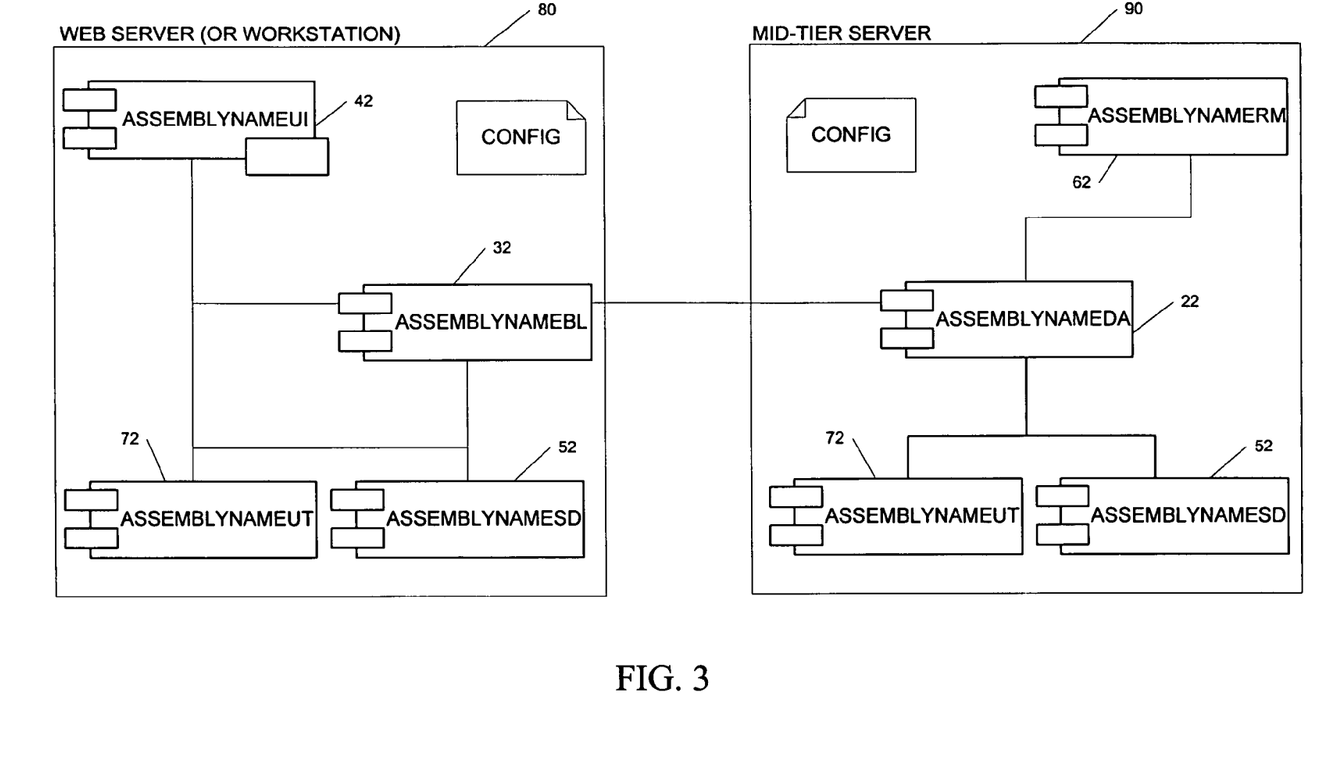
FIG. 3 illustrates the assembly deployment diagram in accordance with an exemplary embodiment of the present invention.

FIG. 3 illustrates the assembly deployment diagram of the exemplary embodiment. Web server or workstation 80 includes deployment of user interface assembly 42, business logic assembly 32, serializable data assembly 52 and utility assembly 72. User interface assembly 42 uses the utility assembly 72 and serializable data assembly 52. Likewise, business logic assembly 32 uses the utility assembly 72 and serializable data assembly 52. Mid-tier server 90 includes deployment of data access assembly 22, remoting host assembly 62, utility assembly 72 and serializable data assembly 52. Data access assembly 22 uses the utility assembly 72 and serializable data assembly 52. Remoting host assembly 62 hosts the data access assembly 22. The business logic assembly deployed to web server or workstation 80 calls the data access assembly 22 and frequently passes serializable data objects.

Figure 4:
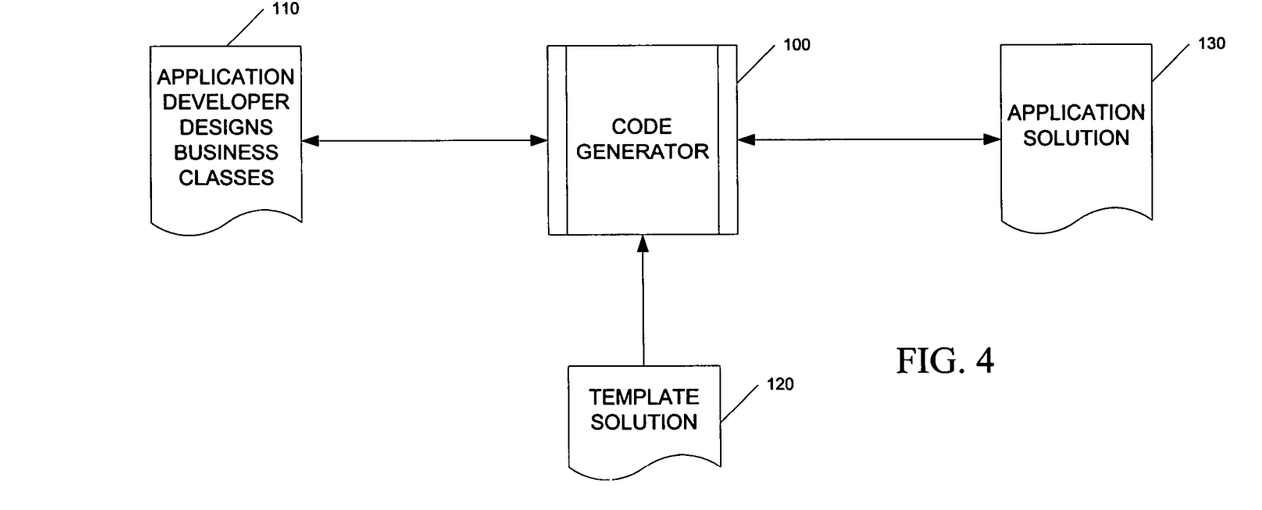
FIG. 4 illustrates the code generator process flow in accordance with an exemplary embodiment of the present invention.

FIG. 4 illustrates the code generator process flow in an exemplary embodiment. The code generator process tool 100 is the main aspect of the invention shown in this figure. The application developer designs business classes as indicated in logic block 110. The business class design is entered into the code generator tool 100. Code generator also reads template solutions from the template solution files 120. Template solution files 120 is a Visual Studio.NET solution that contains templates for the classes and other files for an application. Code generator supports multiple solution templates. Templates can be created for N-tier and single tier applications. Different user interface layer templates can be created, including, but not limited to, Web, Windows and mobile. The code generator tool 100 opens the files in the template solution 120, makes intelligent string replacements and then generates an application solution based on the business class design and template solution as indicated by application solution file 130.

Figure 5:
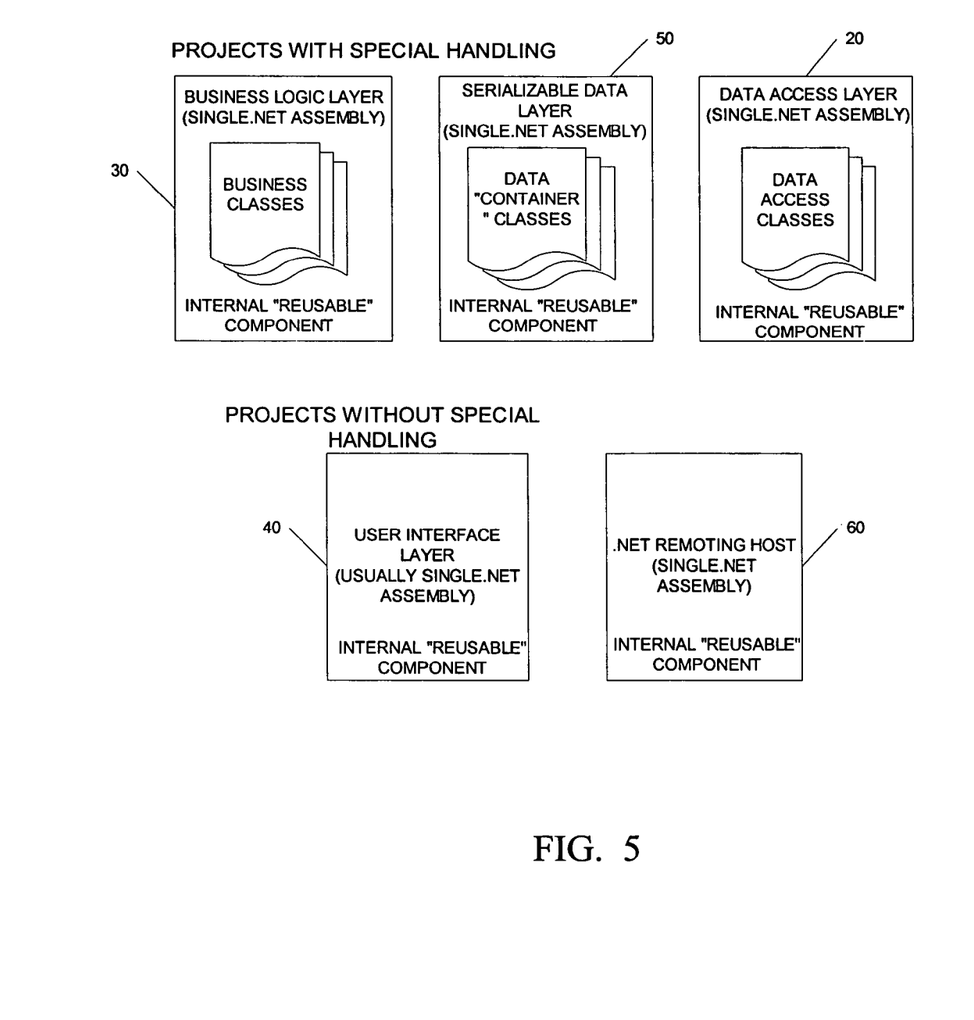
FIG. 5 illustrates a sample solution template in an exemplary embodiment.

FIG. 5 illustrates a sample solution template in an exemplary embodiment of the invention. Templates can include as many .NET assembly projects as needed. Only the business logic layer 30, serializable data layer 50 and data access layer 20 can be modified based on the class design. Assembly projects that do not have special handling concerns are user interface layer 40 and remoting host layer 60.

User Interface Layer

The code generator user interface layer 40 of the present invention is very simple. Developers have to know the following before using the code generator tool:
 a. the application's namespace;
 b. the deploy directory name;
 c. the database type: SQLServer or Oracle or DB2
 d. the application type: Web or Windows
 e. the target source code directory
 f. the class specifications (class name, properties (name/type), and the applicable search criteria (name/type))

The class models can be saved. The code generator tool automatically saves the class model to a temporary file every 60 seconds. The code generator tool allows developers to save the current model and/or reload a saved model.

The code generated by the present invention can be fully compliant with company design, naming, and coding standards. A Visual Studio.NET (VS.NET) solution is created with user interface (UI) 40, business logic (BL) 30, and data access (DA) 20 layers. The serializable data (SD) 52 and remoting (RM) 62 assemblies are also created. The SD assembly 52 includes container classes that are used to pass data between the business logic 30 and data access 20 layers when a data table or dataset is not appropriate. The generated code makes use of common reuse components and compiles after generation with no changes.

The generated code includes custom exception classes, namely, a base application exception and a "multi" exception for validation or other situations where multiple messages are needed. The base classes contain common functionality for UT pages, BL layer 30, and DA layer 20 to help streamline the application code. The BL classes contain example methods including a public method, a public method where a "multi" exception is thrown, and a private function. The DA classes contain example methods including a public method, a public method with database transaction support, and a private function.

Depending on the application type, a user interface is generated for either ASP.NET or WinForms. The ASP.NET user interface includes the following features: (1) integration with Web Authentication; (2) Cascading Stylesheets (CSS) with helpful styles; (3) pixel images and some icons; (4) pages: demo page showing the styles in the CSS, custom errors; and (5) user controls: page header with logout link, navigation bar.

Windows Forms is a framework for building Windows client applications that utilize the Common Language Runtime (CLR). The Windows Forms (WinForms) user interface includes the following features: (1) integration with Cool Windows for login (user authentication); and (2) integration with CoolWindows for the "About" box. CoolWindows is a component that contains forms and controls that can be used in .NET WinForm Applications. The component includes a login dialog, about box, and auto complete combination box.

The generated code includes extensive TODO comments to help identify to code developers what needs to be done. Starter configuration files are generated. Along with config files for several reuse components, client and server side remoting configs are also included. In addition, there are starter monitor scripts for the user interface 40 (for Web Apps) and RM 60 layers. The invention also provides a developer utilities (DevUtils) application to help generate config files with encrypted settings such as database connection strings and assembly passwords.

User Interface—ASP.NET

The user interface layer solution is built prior to doing any other work with the ASP.NET user interface. The user interface (UI) assembly 42 must be built before other pages can be viewed. This is because the other pages actually reference the UI assembly 42 and not the BasePage code in the project. When adding new functionality to the BasePage, the user interface solution will have to be rebuilt before the pages can use the new members or methods. Classes should inherit from the BasePage instead of the System.Web.UI.Page. The using System.Web.SessionState reference at the top of the code-behind for each page should be removed. Code-behind files are pre-compiled modules written in any .NET runtime complaint language. The UI assembly 42 is set as the startup project and the _Template.aspx is set as the startup page.

For security, integration with a single sign-on solution can be included. The implementation is in web.config, Global.asax, and NonSecure/Login.aspx. The application should add user roles to the ticket to help streamline security checking in the use interface 40. Any user information that is needed on multiple pages is added to the UserData member of Cool WebAuthenticator prior to writing the forms authentication ticket. Coolweb Authenticator is a component that assist in integrating Web Authentication into ASP.NET applications. Web Authentication is a series of reusable web pages that provide a single sign on interface to authenticate users of internal and external web applications. CoolMonitor is a component that assists in building web pages that monitor the availability of an application. These monitoring web pages can help detect and troubleshoot many factors that impact an application's availability including network, firewall, database, and software issues. CoolMonitor is used to standardize the output of the monitor script.

User Interface—Windows

In general, the user interface solution is built prior to doing any other work. The user interface 40 is set as the startup project. The Help menu includes the About Box. For security, integration with CoolWindows is included. The implementation is in CoolWindows.WindowsAuthenticator.config and the Main function of the MainForm in the user interface. The CoolWindows.WindowsAuthenticator.config file is modified to meet the needs of the application.

Business Logic Layer

In general, business logic classes should inherit from the BaseBL class. Constructors require a user security token and call the BaseBL constructor. The BaseBL constructor validates the user's token, retrieves the BL assembly token, and configures remoting. No system generated exceptions should escape the BL layer 30. Instead, either the application exceptions DEPLOYDIRNAMEException or DEPLOYDIRNAMEMultiException should be used to hide the details. The real exception should be logged using CoolTracer. CoolTracer is a diagnostic logging component that is configurable and provides automatic log rotation. DEPLOYDIRNAME-MultiException should be used when the caller should be given multiple warning or error messages at one time. For example, when validating user input, there may be many reasons that the input is invalid. In this case, all the validation messages can be gathered and returned to the caller using the DEPLOYDIRNAMEMultiException. An ID property is provided for each class as well as the corresponding serializable data class.

For security, the class constructors will validate the user's security token. If the security token is valid, the user's token and the BL assembly token will be put into the Credentials member variable. The Credentials member variable should be passed to all public DA methods. This information cannot be passed to the DA layer 20 using the DA class constructor because only the default constructor (with no arguments) can be used when calling the DA methods over .NET Remoting. Furthermore, each method should validate that the caller has sufficient permissions to perform the requested action. Methods that will be called by the UT monitor script should also allow the UT assembly token to call those methods.

Data Access Layer

In general, data access classes should inherit from the BaseDA class. Each public method should require a Credentials parameter.

For security, each DA method should validate the calling assembly's token. This token is passed via a Credentials structure. The BaseDA's ValidateCaller function is called to do this. By default, ValidateCaller allows the BL 32 and RM 62 assemblies to make calls. The BL assembly 32 is allowed to call DA methods because the BL assembly 32 has already authorized the user's permissions to perform each action. The RM assembly 62 is allowed to call DA methods because of the monitor script that is required in the remoting host 60. If the user's information is required for security or auditing reasons, the user should use the token on the Credentials parameter. In most cases, it is not necessary to revalidate the user's permissions. This should be done in the BL layer 30. However, if the logic is sensitive, it would be prudent to recheck the user's access anyway.

Data Access

The protected data access methods are the following:
1. GetCommand—returns a command object;
2. GetDataTable—returns a datatable;
3. ExecuteNonQuery—executes a non-query SQL statement to insert, update, or delete records;
4. ExecuteAndFetchRowID—executes a SQL statement (presumably an Insert) and returns the ID of the new record; and
5. ExecuteScalar—returns a single value, such as a record count.

The protected database transactions methods are the following:
1. BeginTransaction—begins a transaction and opens the database connection;
2. RollbackTransaction—rolls back a transaction and closes the database connection; and
3. CommitTransaction—commits a transaction and closes the database connection.

The protected data access helper methods include:
1. CheckForNull (parameter)—checks for null values in a parameter; if the parameter value is null or empty, then DBNull is saved as the value so the field is actually nulled out in the database; and
2. CheckForNull (command)—checks for null values in a command's parameters. If any of the parameter values are null or empty, then DBNull is saved as the value so the field is actually nulled out in the database.

Because the DA classes are running in a .NET Remoting site, debugging does not behave in the exemplary embodiment as normally might be expected. There are several ways to get around this behavior. A break point could be set in a public method on the DA (even if the developer wants to stop four levels deep in private functions). The developer can temporarily disable .NET Remoting by inserting "bad" information into the web.config file on the RM site (i.e., invalid XML).

Remoting Layer

The client side and server side remoting configuration files are generated. The call for Application Configuration to configure remoting is in the p_Initialize method in the BaseBL class. CoolMonitor is used for the output of the monitor script.

Development Utilities (DevUtils)

There are four tabs in the development utilities: UT Settings, BL Settings, DA Settings, and RM Settings. Each tab has a text box that correlates to the default settings included in the settings files in the assembly projects. In the code behind the form, there is a constant called: ASSEMBLY_PATH_UT. It is defaulted to "DEVELOPMENTPATH\ASSEMBLYNAMEUI\Bin\" (e.g., C:\Company\Apps\PoleDesign\ScDistPoleDesignUI). Before using DevUtils, the string must reflect which Configuration mode the projects are being built in. If set to debug, then "Debue\" should be added to the string. If the mode is Release, then "Release\" should be added to the string.

DevUtils uses the configuration mode to determine the location of the compiled user interface.

If the application is a Windows application, then the UT Settings are handled a little differently. Since the UI is an exe, it cannot be referenced by DevUtils. To be able to generate UI Settings, there is a UserinterfaceSettings file in the DevUtils project that is used. When settings are added to the UserinterfaceSettings class in the UI, they must also be added to the UserinterfaceSettings in DevUtils. Otherwise, the settings will not be generated correctly.

Code Generator User Interface

Figure 6:
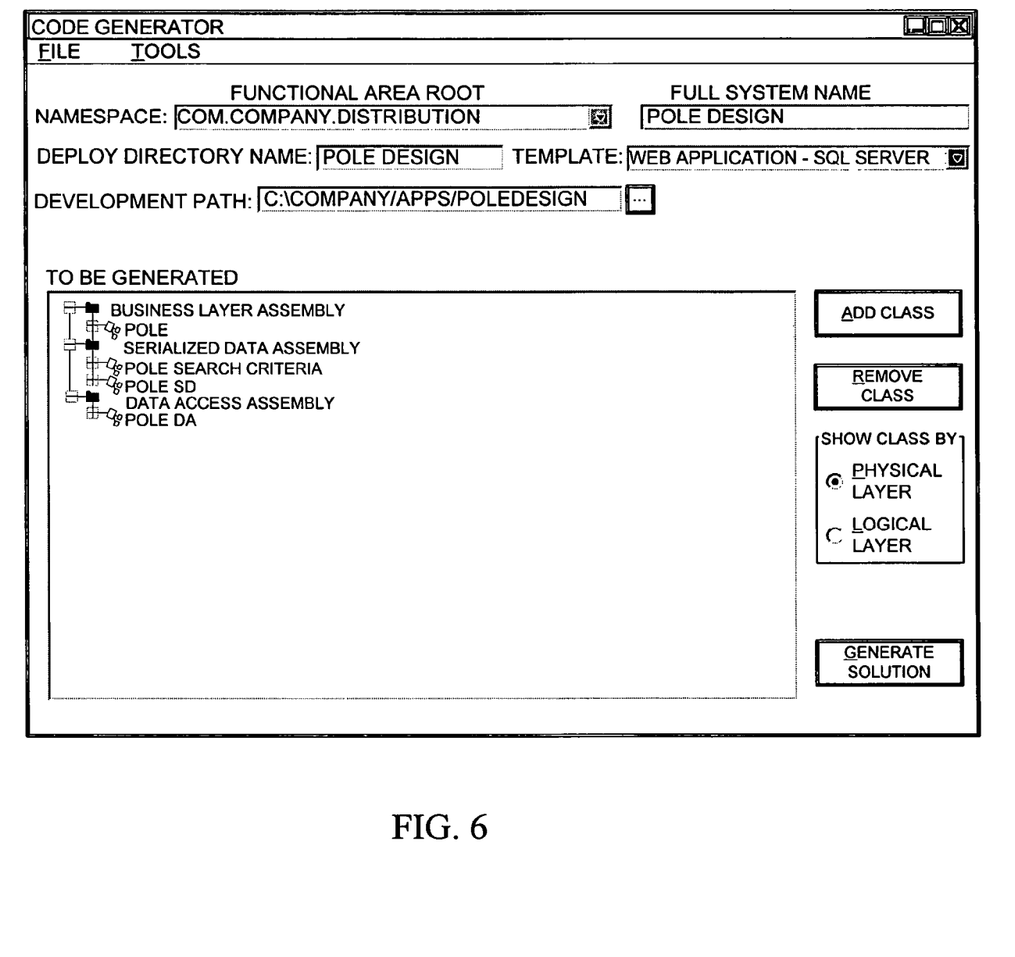
FIG. 6 illustrates an exemplary code generator user interface depicting an exemplary physical layer view of the classes.

An exemplary code generator user interface solution level screen is illustrated in FIG. 6. The normal usage flow uses the following steps:
1. Specify the namespace of the system.
    a. Select a "Functional Area Root"—this will help ensure the namespaces within a business unit or functional area remain consistent; assembly name prefixes are set using this selection.
    b. Type the "Full System Name"—abbreviations should be avoided; the word System or Application should be omitted; the "Deploy Directory Name" will be set to match the "Full System Name", but it can be changed, if desired.
2. Type the "Deploy Directory Name"—this is the name of the directory where the application will be deployed; this value is initially set to match the "Full System Name" but can be changed.
3. Select the "Template" type that the application will leverage.
4. Select the "Development Path"—this is the path where the generated code is to be placed on the workstation; because .NET development requires the files to reside locally, this location must be on a local hard drive and not a network drive; this value is initially set to match the "Full System Name" but can be changed.
5. Use the "Add Class" button to add logical classes to the system. It should be noted that the classes depicted in FIG. 6 do not represent all of the classes in the generated solution.
6. Click the "Generate Solution" button to generate the code.
7. Select "File . . . Open" to open a saved solution model.
8. Select "File . . . Save" to save the current solution model.
9. Select "Tools . . . Other Tasks" to do one or more of the following: (a) save the Solution Model, (b) generate the, virtual directories for the application, and (c) request assembly passwords for the application.

In order to validate the solution, a system name, development and deploy directory name are required. At least one class must have been added.

Figure 7:
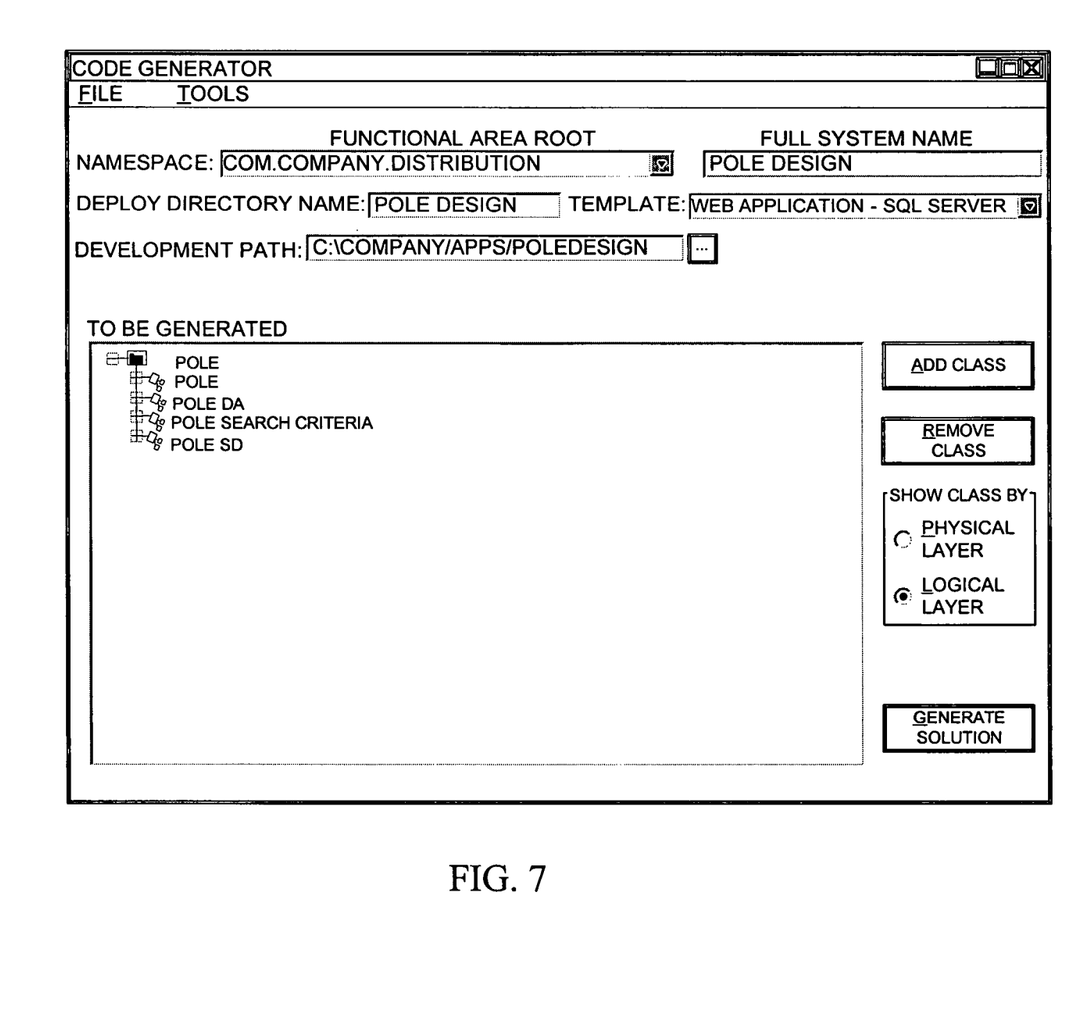
FIG. 7 illustrates an exemplary logical class view.

Additional Features of the Code Generator User Interface
1. Class Model Tree View The class model tree view can be displayed by the physical layer of the classes and by the logical class. Displaying them by the physical layer is the default. FIG. 6 illustrates a physical layer view of the classes. FIG. 7 presents a logical class view. The "Show classes by" radio buttons shown in FIGS. 6-7 are used to change between physical layer and logical class views.

2. Editing and Removing Classes

The current implementation of the exemplary embodiment does not provide a way to edit a class once it has been added. A class can be removed using the "Remove Class" button and then added back with the changes.

3. Adding Classes

Figure 8:
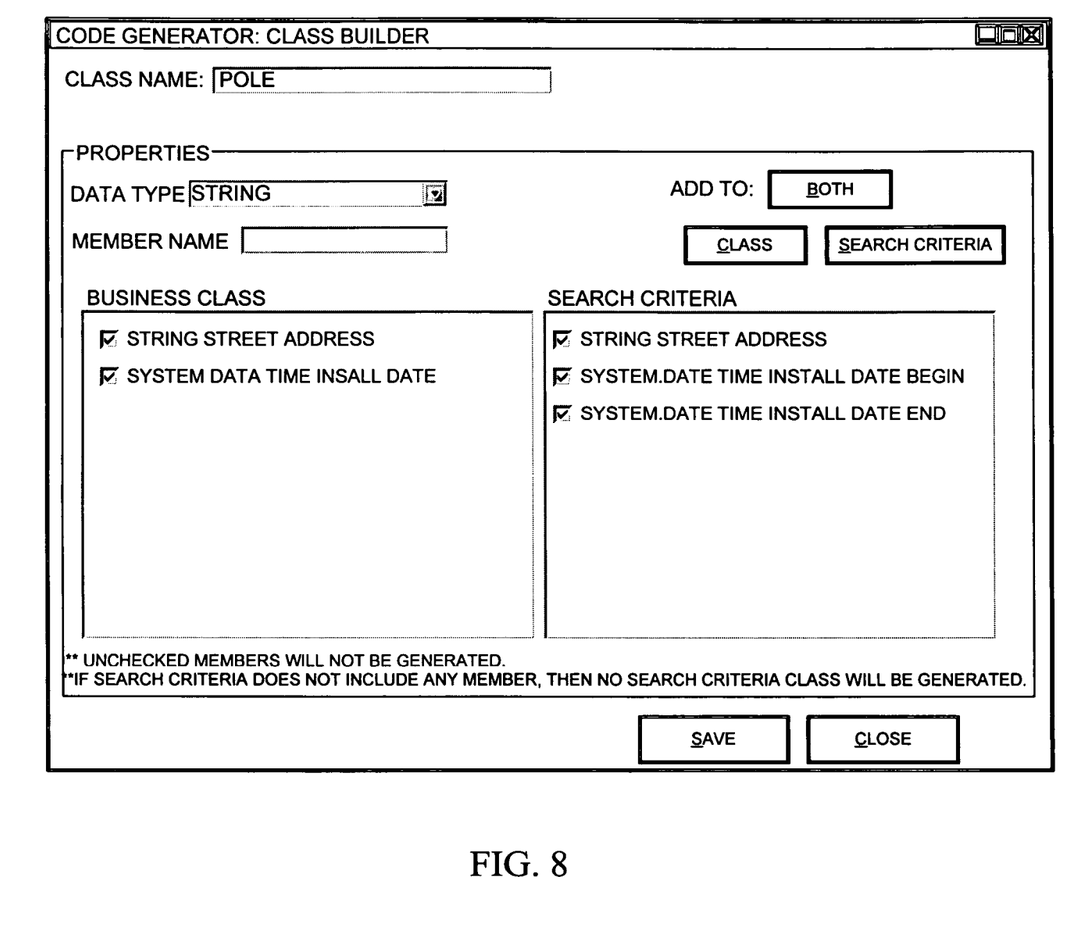
FIG. 8 illustrates a class builder screen in an exemplary embodiment of the invention.

When the "Add Class" button is selected on the Code Generator User Interface screen, the developer is presented with the class builder screen. FIG. 8 illustrates a class builder screen in an exemplary embodiment of the invention. The normal usage flow uses the following steps:
1. Type the name of the logical class.
2. Specify the members of the business class and the search criteria.
    a. Select a data type (e.g., string).
    b. Type the name of the member.
    c. Add the member to the business class, search criteria, or both using the buttons with those labels.
3. Review the class design—a member can be removed by unchecking it.
4. Save the class—this will send the developer back to the main screen where additional classes can be added or the solution generated.

In validating classes for the Code Generator, the following criteria must be met for classes:
1. business layer class must have a name;
2. serializable data class must have a name;
3. data access class must have a name;
4. no ID property added to a business class;
5. no ID property added to a serializable data class; and
6. data access classes have no properties.

The code generator tool of the present invention has been described as a computer implemented process. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the present invention and not in limitation thereof, since the scope of the present invention is defined solely by the appended claims.

The invention claimed is:

1. A method, comprising:
    creating business classes containing a business logic for a software application, wherein the business classes are organized into hierarchies identified as namespaces;
    generating executable programming code for the software application;
    designing a business class and entering the designed business class into a code generator tool that reads template solutions from a template solution file; and
    placing the executable programming code into at least one assembly structure for an associated layer;
    wherein inheritance is based on a type of the associated layer and different base classes are used for different layers, and only a business logic layer, a serializable data layer, and a data access layer included in the template solutions can be modified based on the designed business class wherein the template solutions further include a user interface layer and a remote hosting layer not modified by the class design.

2. The method of claim 1, further comprising:
generating a plurality of templates, each template comprising a plurality of reusable components;
storing the templates in a template solution file; and
selecting at least one template from the plurality of templates in the template solution file.

3. The method of claim 1, wherein the associated layer comprises one of a data layer, a data access layer, a business logic layer, and a user interface layer.

4. The method of claim 3, wherein an executable logic for each layer is placed into an assembly data structure.

5. The method of claim 3, wherein the business logic layer comprises business objects and rules and data manipulation and transformation logic.

6. The method of claim 3, wherein the user interface layer comprises an end user interface into the software application.

7. The method of claim 3, wherein the data access layer comprises an interface into the data layer having generic and specific methods to handle all data input and output for the software application.

8. The method of claim 1, wherein a business logic assembly and a data access assembly include all secure logic for the software application.

9. The method of claim 8, wherein a plurality of methods in each of the business logic assembly and the data access assembly require a security token to be passed to each respective assembly in order to access the plurality of methods.

10. A non-transitory computer readable medium comprising instructions that, when executed by a processor, are configured to cause the processor to:
create business classes containing a business logic for a software application, wherein the classes are organized into hierarchies identified as namespaces;
generate executable programming code for the software application;
design a business class and enter the designed business class into a code generator tool configured to read template solutions from a template solution file; and
place the executable programming code into at least one assembly structure for an associated layer;
wherein inheritance is based on a type of the associated layer and different base classes are used for different layers, and only a business logic layer, a serializable data layer, and a data access layer included in the template solutions can be modified based on the designed business class wherein the template solutions further include a user interface layer and a remote hosting layer not modified by the class design.

11. The non-transitory computer readable medium of claim 10, wherein the instructions are further configured to cause the processor to:
enable a remote host to interact on the processor via deployment of a user interface assembly, a business logic assembly, a serializable data assembly, and a utility assembly;
generate a plurality of templates, each template comprising a plurality of reusable components;
store the templates in a template solution file; and
select at least one template from the plurality of templates in the template solution file.

12. The non-transitory computer readable medium of claim 10, wherein the associated layer comprises one of a data layer, a data access layer, a business logic layer, and a user interface layer.

13. The non-transitory computer readable medium of claim 10, wherein the associated layers comprise one of a serializable data layer and a remote host layer.

14. The non-transitory computer readable medium of claim 12, wherein an executable logic for each layer is placed into an assembly data structure.

15. The non-transitory computer readable medium of claim 12, wherein the business logic layer comprises program instructions that define business objects and rules and data manipulation and transformation for a plurality of business logic classes.

16. The non-transitory computer readable medium of claim 12, wherein the user interface layer comprises program instructions that generate an end user interface into the software application.

17. The non-transitory computer readable medium of claim 12, wherein the data access layer comprises program instructions that generate an interface into the data layer and define generic and specific methods for a plurality of data access classes to handle all data input and output for the software application.

18. The non-transitory computer readable medium of claim 11, wherein the business logic assembly and the data access assembly comprise program instructions that provide all secure logic for the software application.

19. The non-transitory computer readable medium of claim 18, wherein a plurality of methods in each of the business logic assembly and the data access assembly require a security token to be passed to each respective assembly in order to access the plurality of methods.

20. The non-transitory computer readable medium of claim 18, wherein the program instructions in a user interface assembly pass a user token to the business logic assembly to access the business logic methods of the business logic classes.

\* \* \* \* \*